United States Patent
Eng et al.

(10) Patent No.: US 7,822,922 B2
(45) Date of Patent: *Oct. 26, 2010

(54) ACCESSING DATA STORAGE SYSTEMS WITHOUT WAITING FOR READ ERRORS

(75) Inventors: Michael Eng, San Jose, CA (US); David Wong, Cupertino, CA (US); Lamont Benaresh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 11/682,113

(22) Filed: Mar. 5, 2007

(65) Prior Publication Data

US 2007/0150686 A1 Jun. 28, 2007

Related U.S. Application Data

(63) Continuation of application No. 10/831,417, filed on Apr. 22, 2004, now Pat. No. 7,213,103.

(51) Int. Cl.
*G06F 13/00* (2006.01)
*G06F 12/00* (2006.01)

(52) U.S. Cl. .............................. 711/114; 711/154; 714/6
(58) Field of Classification Search ................. 711/114, 711/154; 714/6
See application file for complete search history.

(56) References Cited

U.S. PATENT DOCUMENTS

| | | |
|---|---|---|
| 4,467,419 A | 8/1984 | Wakai |
| 4,558,413 A | 12/1985 | Schmidt et al. |
| 4,631,673 A | 12/1986 | Haas |
| 4,761,737 A | 8/1988 | Duvall |
| 4,953,080 A | 8/1990 | Dysart et al. |

(Continued)

FOREIGN PATENT DOCUMENTS

DE 3919802 12/1989

(Continued)

OTHER PUBLICATIONS

Computer dictionary, 1997, Microsoft Press, Third Edition, p. 121.

(Continued)

*Primary Examiner*—Hong Kim
(74) *Attorney, Agent, or Firm*—Beyer Law Group LLP

(57) ABSTRACT

Improved techniques for accessing data storage systems are disclosed. These techniques detect, correct and prevent undesirable access delays experienced in storage systems. "Slow-access" refers to an access operation that does not successfully complete within a predetermined amount of time. When slow-access is detected, an attempt is made to provide data by other means rather than waiting for the access operation to eventually complete. By way of example, parity information is used to generate data rather than waiting beyond a predetermined amount of time for a "slow-read" operation to complete. In addition, preventative measures can be taken to avoid reoccurrence of a "slow-access" operating once it has been identified. These preventative measures, for example, include rewriting the same data to the same data section that caused the slow-access problem or remapping the section to another section in order to avoid the same section of data to cause another slow access problem.

18 Claims, 6 Drawing Sheets

U.S. PATENT DOCUMENTS

| | | | |
|---|---|---|---|
| 5,163,148 A | 11/1992 | Walls | |
| 5,175,849 A | 12/1992 | Schneider | |
| 5,201,044 A | 4/1993 | Frey, Jr. et al. | |
| 5,276,860 A | 1/1994 | Fortier | |
| 5,369,757 A | 11/1994 | Spiro | |
| 5,375,232 A | 12/1994 | Legvold | |
| 5,379,412 A | 1/1995 | Eastriudge | |
| 5,381,545 A | 1/1995 | Baker | |
| 5,386,554 A | 1/1995 | Nozaki | |
| 5,403,639 A | 4/1995 | Belsan | |
| 5,454,103 A | 9/1995 | Coverston | |
| 5,487,160 A | 1/1996 | Bemis | |
| 5,594,900 A | 1/1997 | Cohn et al. | |
| 5,603,020 A | 2/1997 | Hashimoto | |
| 5,623,598 A | 4/1997 | Voigt et al. | |
| 5,627,996 A | 5/1997 | Bauer | |
| 5,636,359 A | 6/1997 | Beardsley | |
| 5,636,360 A | 6/1997 | Courts et al. | |
| 5,642,501 A | 6/1997 | Doshi | |
| 5,664,177 A | 9/1997 | Lowry | |
| 5,664,186 A | 9/1997 | Bennett | |
| 5,724,552 A | 3/1998 | Taoda | |
| 5,742,752 A | 4/1998 | DeKoning | |
| 5,764,972 A | 6/1998 | Crouse | |
| 5,771,379 A | 6/1998 | Gore | |
| 5,778,411 A | 7/1998 | DeMoss | |
| 5,819,275 A | 10/1998 | Badger | |
| 5,875,459 A | 2/1999 | Taoda | |
| 5,918,229 A | 6/1999 | Davis | |
| 5,953,689 A | 9/1999 | Hale et al. | |
| 6,101,615 A | 8/2000 | Lyons | |
| 6,151,659 A | 11/2000 | Solomon | |
| 6,233,648 B1 | 5/2001 | Tomita | |
| 6,263,298 B1 | 7/2001 | Kerman et al. | |
| 6,311,193 B1 | 10/2001 | Sekido | |
| 6,353,837 B1 | 3/2002 | Blumenau | |
| 6,397,311 B1 | 5/2002 | Capps | |
| 6,606,585 B1 | 8/2003 | Borowsky et al. | |
| 6,651,137 B2 | 11/2003 | Baek | |
| 6,654,772 B1 | 11/2003 | Crow | |
| 6,671,772 B1 | 12/2003 | Cousins | |
| 6,687,793 B1 | 2/2004 | Thomas et al. | |
| 6,775,679 B2 | 8/2004 | Gupta | |
| 6,823,336 B1 | 11/2004 | Srinivasan | |
| 6,829,617 B2 | 12/2004 | Sawdon | |
| 6,981,171 B2 | 12/2005 | Hashemi | |
| 7,085,785 B2 | 8/2006 | Sawdon | |
| 7,134,053 B1 | 11/2006 | Moore | |
| 7,213,103 B2 | 5/2007 | Eng et al. | |
| 7,275,179 B1 * | 9/2007 | Coatney | 714/7 |
| 2001/0055226 A1 | 12/2001 | Miura et al. | |
| 2002/0091903 A1 | 7/2002 | Mizuno | |
| 2002/0103969 A1 | 8/2002 | Koizumi et al. | |
| 2002/0112022 A1 | 8/2002 | Kazar | |
| 2002/0194209 A1 | 12/2002 | Bolosky | |
| 2003/0074528 A1 | 4/2003 | Soejima et al. | |
| 2003/0145167 A1 | 7/2003 | Tomita | |
| 2003/0158873 A1 | 8/2003 | Sawdon | |
| 2003/0159007 A1 | 8/2003 | Sawdon | |
| 2003/0212872 A1 | 11/2003 | Patterson et al. | |
| 2004/0024900 A1 | 2/2004 | Breiter et al. | |
| 2004/0103189 A1 | 5/2004 | Cherkasova et al. | |
| 2004/0148444 A1 | 7/2004 | Thomas et al. | |
| 2005/0138284 A1 | 6/2005 | Cohn et al. | |
| 2005/0223269 A1 | 10/2005 | Stolowitz | |
| 2005/0240742 A1 | 10/2005 | Eng et al. | |
| 2006/0077894 A1 | 4/2006 | Schmuck | |
| 2006/0184587 A1 | 8/2006 | Federwisch | |
| 2006/0206536 A1 | 9/2006 | Sawdon | |

FOREIGN PATENT DOCUMENTS

| | | |
|---|---|---|
| EP | 0 278 313 | 8/1988 |
| EP | 0 339 221 | 11/1989 |
| EP | 0 341 037 | 11/1989 |
| EP | 0 501 160 | 9/1992 |
| EP | 0 566 966 | 10/1993 |
| EP | 0 679 028 | 10/1995 |
| EP | 0 238 158 | 12/1995 |
| EP | 0 840 242 | 5/1998 |
| EP | 1 246 061 | 10/2002 |
| GB | 2 218 833 | 11/1989 |
| JP | 09265357 A | 10/1997 |
| WO | WO93/08529 | 4/1993 |
| WO | WO98/20419 | 5/1998 |
| WO | WO99/13403 | 3/1999 |
| WO | WO99/63441 | 12/1999 |

OTHER PUBLICATIONS

Benford, "Dynamic Definition of Entries and Attributes in the Directory Service," 8th International Conference on Distributed Computing Systems, Jun. 13-17, 1988, pp. 563-568.

Chang et al., "Extended K-d Tree Database Organization" A Dynamic Multiattribute Clustering Method, IEEE Transactions on Software Engineering, vol. SE-7, No. 3, May 1981, pp. 284-290.

Chen et al., "A Performance Evaluation of Raid Architectures," IEEE Transactions on Computers, vol. 45, No. 10, Oct. 1996, pp. 1116-1130.

Chen et al., "Schemes for Snapshot Advancement for Multiversion Concurrency Control," IBM Technical Disclosure Bulletin, vol. 34, No. 12, May 1992, pp. 135-137.

Coley, "Support of a Dynamically Managed Device Switch Table on a UNIX Operating System," IBM Technical Disclosure Bulletin, vol. 34, No. 10A, Mar. 1992, pp. 130-132.

Condry et al., "The Object-Oriented Advantage in Prototyping a Remote File System," Proceedings of the Second International Workshop on Object Orientation in Operating Systems, Sep. 24-25, 1992, pp. 190-199.

Corn et al., "Dynamic Memory Estimation for Database Monitor Snapshot," IBM Technical Disclosure Bulletin, vol. , No. , May 1992, pp. 135-137.

Cruz et al., "Dunes: A Performance—Oriented System Support Environment for Dependency Maintenance in Workstation Networks," Proceedings of the Eighth International Symposium on High Performance Distributed Computing, 1999, pp. 309-318.

de Jonge et al., "Concurrent Access to B-trees," International Conference on Databases, Parallel Architectures and their Applications, PARBASE-90, Mar. 7-9, 1990, pp. 312-320.

Duvall et al., "Database Server Journal Backup Automation Technique," IBM Technical Disclosure Bulletin, vol. 36, No. 2, Feb. 1993, p. 463.

Emma et al., "Exclusive Use Directory and Inode Caching," IBM Technical Disclosure Bulletin, vol. 32, No. 7, Dec. 1989, pp. 279-280.

Gait, "Stability, Availability, and Response in Network File Service," IEEE Transactions on Software Engineering, vol. 17, No. 2, Feb. 1991, pp. 133-140.

Greene, "Indicating the "File Types" in the Files Window of a User-Interactive Display System," IBM Technical Disclosure Bulletin, vol. 29, No. 6, Nov. 1986, p. 2684.

Helary et al., "Computing Particular Snapshots in Distributed Systems," Ninth Annaul International Phoenix Conference on Computers and Communications, Mar. 21-23, 1990, pp. 116-123.

Henson, "Managing Executing Files in a Virtual File System," IBM Technical Disclosure Bulletin, vol. 30, No. 10, Mar. 1988, pp. 68-69.

Heyrman et al., "Storage Management Mechanism for Managing Snapshot Pages, " IBM Technical Disclosure Bulletin, vol. 35, No. 4B, Sep. 1992, pp. 26-29.

Honishi et al., "An Index Structure for Parallel Database Processing," Second International Workshop on Research Issues on Data Engineering, Transaction and Query Processing, Feb. 2-3, 1992, pp. 224-225.

Hsieh et al., "Performance Evaluation of *Software Raid* vs. *Hardware RAID* for Parallel Virtual File System," Proceedings of the Ninth International Conference on Parallel and Distributed Systems, 2002, pp. 1-7.

Hua et al., "Improving RAID Performance Using a Multibuffer Technique," Proceedings of the 15$^{th}$ International Conference on Data Engineering, Mar. 23-26, 1999, pp. 79-86.

Hwang et al., "Orthogonal Striping and Minoring in Distributed RAID for I/O-Centric Cluster Computing," IEEE Transactions on Parallel and Distributed Systems, vol. 13, No. 1, Jan. 2002, pp. 26-44.

Hwang et al., "Reliable Cluster Computing with a New Checkpointing RAID-x Architecture," Proceedings of the 9$^{th}$ International Heterogeneous Computing Workshop, 2000, pp. 171-184.

Jin et al., "Improving Partial Stripe Write Performance in RAID Level 5," Proceeding of the Second IEEE International Caracas Conference on Devices, Circuits and Systems, 1998, pp. 396-400.

Kashyap et al., "Analysis of the Multiple-Attribute-Tree Data-Base Organization," IEEE Transactions on Software Engineering, vol. SE-3, No. 6, Nov. 1977, pp. 451-467.

Kemper et al., "Adaptable Pointer Swizzling Strategies in Object Bases," Ninth International Conference on Data Engineering, Apr. 19-23, 1993, pp. 155-162.

Kumar, "Coping with Conflicts in an Optimistically Replicated File System," IEEE Workshop on the Management of Replicated Data, Nov. 8-9, 1990, pp. 60-64.

Mogi et al., "Dynamic Parity Stripe Reorganizations for RAID5 Disk Arrays," Proceedings of the Third International Conference on Parallel and Distributed Information Systems, Sep. 28-30, 1994, pp. 17-26.

Park et al., "Striping in Disk Array RM2 Enabling the Tolerance of Double Disk Failures," Proceedings of the 1996 ACM/IEEE Conference on Supercomputing (SC'96).

Pilarski et al., "Checkpointing for Distributed Databases: Starting from the Basics," IEEE Transactions on Parallel and Distributed Systems, vol. 3, No. 5, Sep. 1992, pp. 602-610.

Santry, "Elephant: The File System that Never Forgets," Proceedings of the Seventh Workshop on Hot Topics in Operating Systems, 1999, pp. 2-7.

Sechrest et al., "Blending Hierarchical and Attribute-Based File Naming," Proceedings of the 12$^{th}$ International Conference on Distributed Computing Systems, Jun. 9-12, 1992, pp. 572-580.

Venkatesan, "Message-Optimal Incremental Snapshots," 9$^{th}$ International Conference on Distributed Computing Systems, Jun. 5-9, 1989, pp. 53-60.

Watanabe et al., "Eliminate Information Inconsistency for X.500 Directory," Singapore ICCS '94 Conference Proceedings, Nov. 14-18, 1994, pp. 1180-1184.

Wilson, "Operating System Support for Small Objects," Workshop on Object Orientation in Operating Systems, Oct. 17-18, 1991, pp. 80-86.

Yang et al., "Global Snapshots for Distributed Debugging," Proceedings of the Fourth International Conference on Computing and Information, ICCI '92, May 28-30 1992, pp. 436-440.

Tobagi et al. "Streaming RAID-A Disk Array Management System for Video Files." No date available, Starlight Networks, Inc.

U.S. Appl. No. 10/303,121 filed on Nov. 22, 2002.
U.S. Appl. No. 10/831,382 filed on Apr. 22, 2004.
U.S. Appl. No. 10/831,417 filed on Apr. 22, 2004.

* cited by examiner

ACCESSING DATA STORAGE SYSTEMS WITHOUT WAITING FOR READ ERRORS

This application is a continuation of and claims priority from U.S. patent application Ser. No. 10/831,417, filed Apr. 22, 2004, now U.S. Pat. No. 7,213,103 issued on May 1, 2007, which is commonly assigned, and which is incorporated by reference herein in its entirety and for all purposes.

This application is related to U.S. patent application Ser. No. 10/831,382, entitled "METHOD AND APPARATUS FOR EVALUATING AND IMPROVING DISK ACCESS TIME IN A RAID SYSTEM," filed on Apr. 22, 2004, now U.S. Pat. No. 7,383,400 issued on Jun. 3, 2008, and hereby incorporated herein by reference for all purposes. This application is also related to U.S. Pat. No. 7,134,053, issued on Nov. 7, 2006, which is also hereby incorporated herein by reference for all purposes.

BACKGROUND OF THE INVENTION

The present invention relates generally to data storage systems for use with computing systems and, more particularly, to techniques for accessing data from the data storage systems.

Most computing systems use a storage device to store data. A disk drive is an example of a storage device that is commonly used with computers, including desktop computers, notebook computers and servers. Disk drives are used for many purposes. Over the years storage devices (e.g., disk drives) have become more advanced so as to offer greater performance and storage capacity. Manufacturers of disk drives provide data sheets or specifications that detail performance and capacity of their disk drives. This is partially attributed to higher performance and storage capacity requirements for some applications.

Data throughput rate for disk drives is essential for certain applications. For example, in the case of streaming data (e.g., audio or video data), time performance is of particular concern because if a data stream is temporarily delayed, the recipient of the data stream receives no data during the delay. The delay can cause slow spots, jitter or other undesired artifacts to occur in the presentation of the data. By way of example, a real time video playback stream typically requires a relatively high constant data rate. For a 10-bit High Definition (HD) video that outputs about 30 frames per second, this constant data rate amounts to about 165 MB of data per second. Data rates such as this, however, cannot always be maintained using conventional techniques. As a result, significant delays in data access are experienced and often manifest in undesirable effects (e.g., dropping one or more frames of a real time video play back).

Accordingly, improved techniques for accessing data storage systems are needed.

SUMMARY OF THE INVENTION

Broadly speaking, the invention pertains to improved techniques for accessing data storage systems. These techniques can be used to detect, correct and prevent undesirable access delays experienced in storage systems.

In accordance with one aspect of the invention, a "slow-access" criteria is defined for an operation that accesses a storage device. The "slow-access" criteria defines an acceptable access time for the access operation to successfully complete. In one embodiment, "slow-access" is defined as an access operation that does not successfully complete within a predetermined amount of time (e.g., a slow-access time or threshold). The slow-access time can, for example, be defined based on the needs of a specific application or other system requirements. As such, a "slow access" indicates a potential performance problem that can manifest in undesirable effects. Hence, when a slow-access problem is detected, an attempt is made to correct the slow-access problem rather than waiting for the access operation to eventually complete. As will be appreciated, an attempt can be made to provide the data by other means when "slow-access" is detected. By way of example, parity information can be used in accordance with one embodiment of the invention in an attempt to generate data rather than waiting beyond a predetermined amount of time for a "slow-read" operation to complete.

In accordance with another aspect of the invention, preventative measures can be taken to avoid reoccurrence of a "slow-access" once it has been identified. This prevents the reoccurrence of, for example, the same "slow-read" problem time after time. These preventative measures, for example, include rewriting the same data to the same data section that caused the slow-access problem or remapping the section to another section in order to avoid the same section of data causing another slow access problem.

The invention can be implemented in numerous ways, including as a method, system, device, apparatus, or computer readable medium. Other aspects and advantages of the invention will become apparent from the following detailed description, taken in conjunction with the accompanying drawings, illustrating by way of example the principles of the invention.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE INVENTION

Figure 1A:
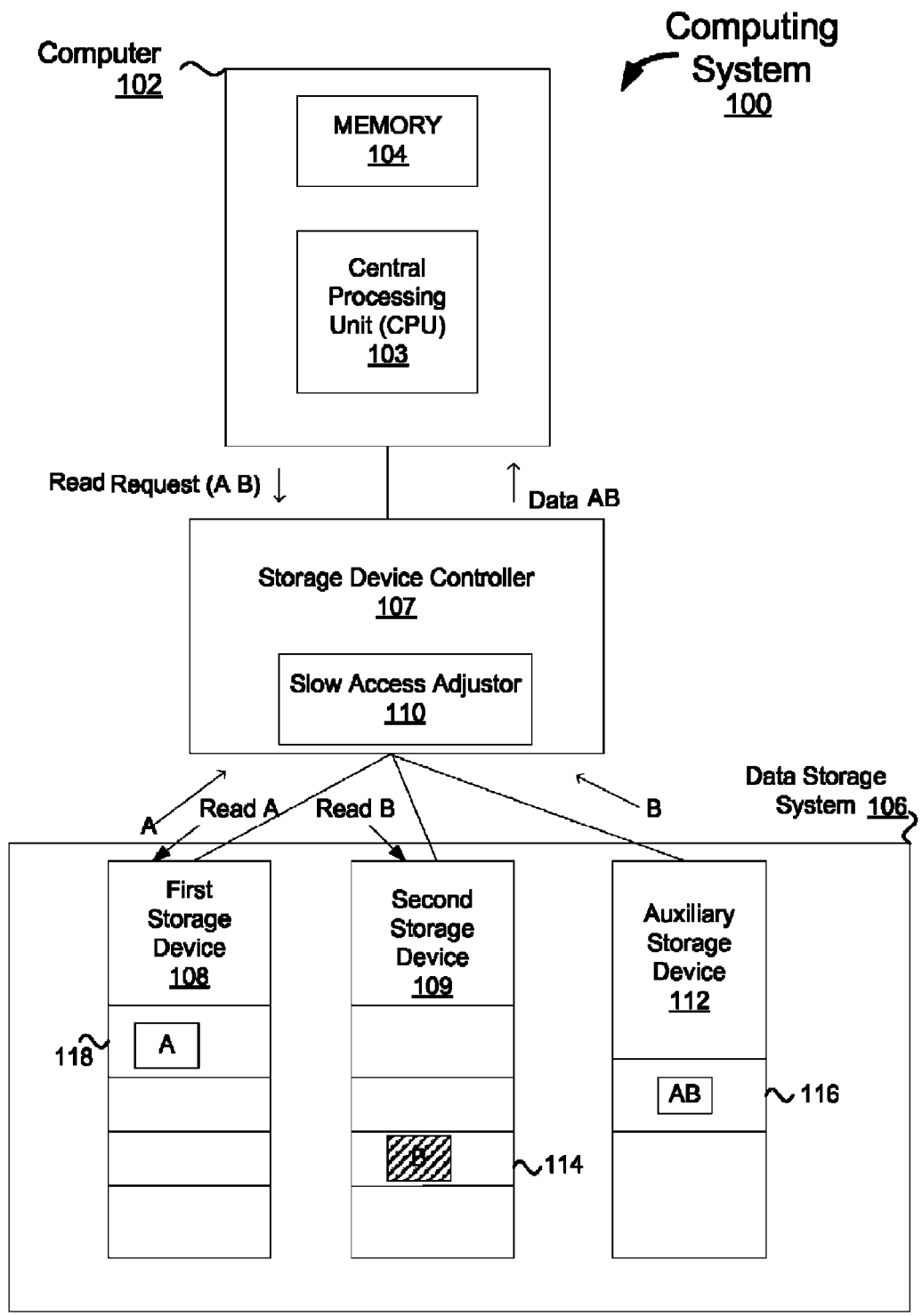
FIGS. 1A and 1B depict a computing system in accordance with one embodiment of the invention.

As noted above, conventional data accessing techniques in some cases fail to access data storage systems (e.g., hard drives, disks) at an acceptable rate. One such example is real time video playback where relatively high data rates are required (e.g., 165 MB per second) to display about 30 frames per second. This high data rate cannot be maintained using conventional techniques. As a result, one or more frames can be dropped. Consequently, the real time video is not displayed appropriately.

One reason for this failure is that sometimes it takes significantly longer than expected to access a data storage device (e.g., hard drive, disk). As a result, data cannot be provided in a timely manner. As will be known to those skilled in the art, this delay can be attributed to many factors including, for example, a defective media, vibrations, head defects, or poor storage of write data. One example of a "slow-access" operation is a "slow-read" operation that takes longer than expected or required to read data from a hard drive or disk. It should be noted that unlike an access failure (e.g., a read failure on a bad block), a "slow-access" does not typically generate an error. This means that unlike a read failure, a "slow read" operation will eventually complete and return the desired data. However, experimental data has confirmed that the delay caused by "slow access" (e.g., "slow read") is unacceptable for some applications. Thus, improved techniques for accessing data storage systems are needed.

Accordingly, the invention pertains to improved techniques for accessing data storage systems. These techniques can be used to detect, correct and prevent undesirable access delays experienced in storage systems. In accordance with one aspect of the invention, a "slow-access" criteria is defined for an operation that accesses a storage device. The "slow-access" criteria defines an acceptable access time for the access operation to successfully complete. In one embodiment, "slow-access" is defined as an access operation that does not successfully complete within a predetermined amount of time (e.g., a slow-access time or threshold). As will be appreciated, the slow-access time can, for example, be defined based on the needs of a specific application or other system requirements. As such, a "slow access" indicates a potential performance problem that can manifest in undesirable effects. Hence, when a slow-access problem is detected, an attempt is made to correct the slow-access problem rather than waiting for the access operation to eventually complete. As will be appreciated, an attempt can be made to provide the data by other means when slow-"access" is detected. By way of example, parity information is used in accordance with one embodiment of the invention in an attempt to generate data rather than waiting beyond a predetermined amount of time for a "slow-read" operation to complete.

In accordance with another aspect of the invention, preventative measures are taken to avoid reoccurrence of a "slow-access" once it has been identified. This prevents the reoccurrence of, for example, the same "slow-read" problem time after time. These preventative measures, for example, include rewriting the same data to the same data section that caused the slow-access problem or remapping the section to another section in order to avoid the same section of data to cause another slow access problem.

Embodiments of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A is a block diagram of a computing system 100 according to one embodiment of the invention. As shown in FIG. 1A, a computer 102 is connected to a data storage system 106 via a storage device controller 107. The computer 102 uses the storage device controller 107 to access data stored in the data storage system 106. In general, the computer 102 can be any computing device that includes at least one Central Processing Unit (CPU) 103 and memory 104. As such, the computer 102 can, for example, be a multi-purpose desktop computer, a server, or a multi-processing server. In any case, the computer 102 uses the data storage system 106 for data storage (e.g., main storage, secondary memory).

It should be noted that the data storage system 106 typically includes a plurality of storage devices (e.g., disks, hard drives). As such, storage device controller 107 can, for example, be a redundant array of independent disks (RAID) controller that controls a plurality of hard drive arranged in one or more disk arrays of a RAID. The storage device controller 107 is provided as an interface to the data storage system 106. As such, the computer 102 can use this interface to access data stored in data storage system 106 without having to address each one of the disks individually.

As illustrated in FIG. 1A, these storage devices can, for example, include first and second storage devices 108 and 109 and an auxiliary storage device 112. The first and second storage devices 108 and 109 can serve as main storage while auxiliary storage device 112 can serve as backup to the data stored in the main storage (i.e., first and second storage devices 108 and 109). Although the storage device 112 can be comprised of several components, it should be noted that from the perspective of the computer 102 the data storage 106 is a single logical unit. As such, the computer 102 can, request a logical read, write, or perform other data access requests to be performed without having to individually address various storage devices of the data storage system 106. Upon request, the storage device controller 104, in turn, initiates access operations on individual storage devices of the storage device system 106 in order to perform the requested operation (e.g., writes the requested data, reads data and returns it, etc.). Hence, the computer 102 can use the storage device controller 107 to perform various data access operations without having to address the implementation details of the data storage system 106.

Moreover, the storage device controller 107 provides a slow-access adjustor 110 that detects potential performance problems. The slow-access adjustor 110 detects that an access operation (e.g., read) has not completed within a predetermined amount of time. This operation can be referred to as a "slow-access" operation (e.g., slow-read operation). When the slow-access adjustor 110 detects a "slow access" operation as a potential performance problem, it attempts to provide data using the backup information to generate the desired data rather than waiting for the "slow access" operation to complete.

By way of example, in response to a read request (A, B) to obtain data portions A and B, the storage device controller 107 initiates a read (A) on the first storage device 108 and a read (B) on the second storage device 109. The slow-access adjustor 110 determines whether both of these read operations have successfully completed within a predetermined amount of time. This predetermined time period can, for example, represent an acceptable threshold for a particular application (e.g., response time needed from each read operation to maintain a particular data rate). A timer can, for example, be used to measure this predetermined amount of time. In any case, the slow-access adjustor 110 can determine that a read operation has not successfully completed within a predetermined time period (or slow-access threshold). In the example illustrated in FIG. 1, the slow-access adjustor 110 detects that the read (B) operation did not successfully complete within a predetermined time period while the read (A) did. In other words, it is determined that data portion B in section 114 of the second storage device 109 was not read within the predetermined time period. As a result, the slow-access adjustor 110 attempts to generate data portion (B) from the backup data 116 stored in the auxiliary device 112. If this attempt is successful, data B can be obtained without having to wait for the read (B) operation to complete.

As will be appreciated by those skilled in the art, data can be obtained or generated from backup data, for example, by using parity information. This parity information can, for example, be the result of the exclusive-OR (XOR) of data stored in section 118 of the first storage device (A) and data stored in section 114 of the second storage device (B). In any case, if data stored in section 114 (B) can be generated using the backup information stored in auxiliary storage device 112 (e.g., XOR of A and B), the read (B) operation is aborted and the generated data (B) is returned to the computer 102. Again, this means that data (A, B) can be provided to the computer 102 without having to wait for the read operation (B) to complete. As a result, a slow-access problem can be identified as a potential performance operation and resolved by the slow-access adjustor 110 using back-up information.

In addition, the storage device controller 107 can prevent "slow-access" problems from happening in the future. In one embodiment, the slow-access adjustor 110 marks sections 114 of the second storage device 109 as a "slow-access" section (e.g., slow-read section). Appropriate action can then be taken to prevent future slow-access problems from being encountered on the same section of the storage device after the section has been marked. By way of example, data can be rewritten to the same marked section 114 or it can be written (i.e., moved) to a different section of the second storage device 109 (i.e., remapped).

Figure 1B:
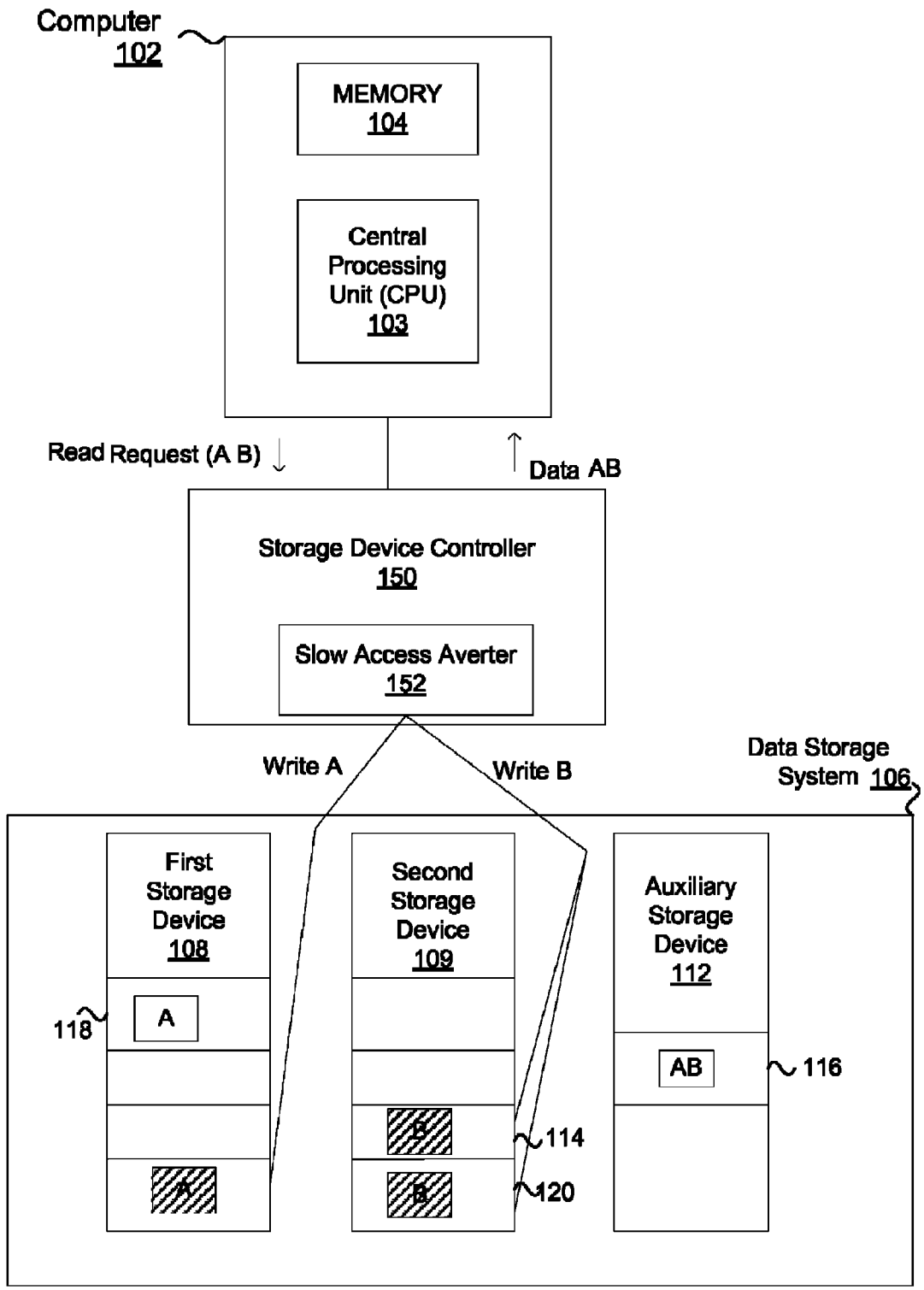

To further illustrate some exemplarily operations that can be performed to prevent reoccurrence of slow-access problems, FIG. 1B depicts a storage device controller 150 in accordance with another embodiment of the invention. The storage device controller 150 provides a slow-access averter 152 that performs various operations that can prevent "slow-access". These operations are typically performed on a section of a storage device that has been identified (e.g., marked) as having caused a "slow-access" (e.g., section 114). These preventative operations, for example, include rewriting (i.e., over-writing) data B to the marked section 114 of the second storage device 109. As another example, data originally written to the marked section 114 (data portion (B)) can be written to another section, namely section 120. In other words, data portion B can be remapped to a different section of the storage device 110. It should be noted that it is possible that a section 118 of the first storage device can also be remapped as the result of remapping data portion B from section 114 to section 120, so that, for example, both sections of data are stored in a "stripe" across the first and secondary storage devices 108 and 110.

Furthermore, it will be appreciated that rewriting data can eliminate many "slow-access" (e.g., "slow read") situations. Remapping data, however, may be necessary if rewriting it fails to resolve a "slow-access" problem. In general, most "slow-access" problems can be solved by rewriting and/or remapping the data. However, as will be appreciated by those skilled in the art other operations may be necessary in order to solve the "slow-access" problem. These operations include replacing a storage device entirely, reformatting the drive, etc. In any case, when a "slow-access" is identified, for example, by the slow-access adjustor 110 of FIG. 1A, appropriate action can be taken to correct the problem using, for example, a slow access averter 152 of FIG. 1B. It should be noted that preventative operations are typically performed when the computing system is not processing data for an application (e.g., during maintenance time), but this is not a requirement. As such, it may be possible to combine the slow-access adjustor 110 of FIG. 1A and slow-access averter 152 of FIG. 1B in an attempt to correct an identified "slow-access" situation as soon as possible even during execution time of an application.

Figure 2:
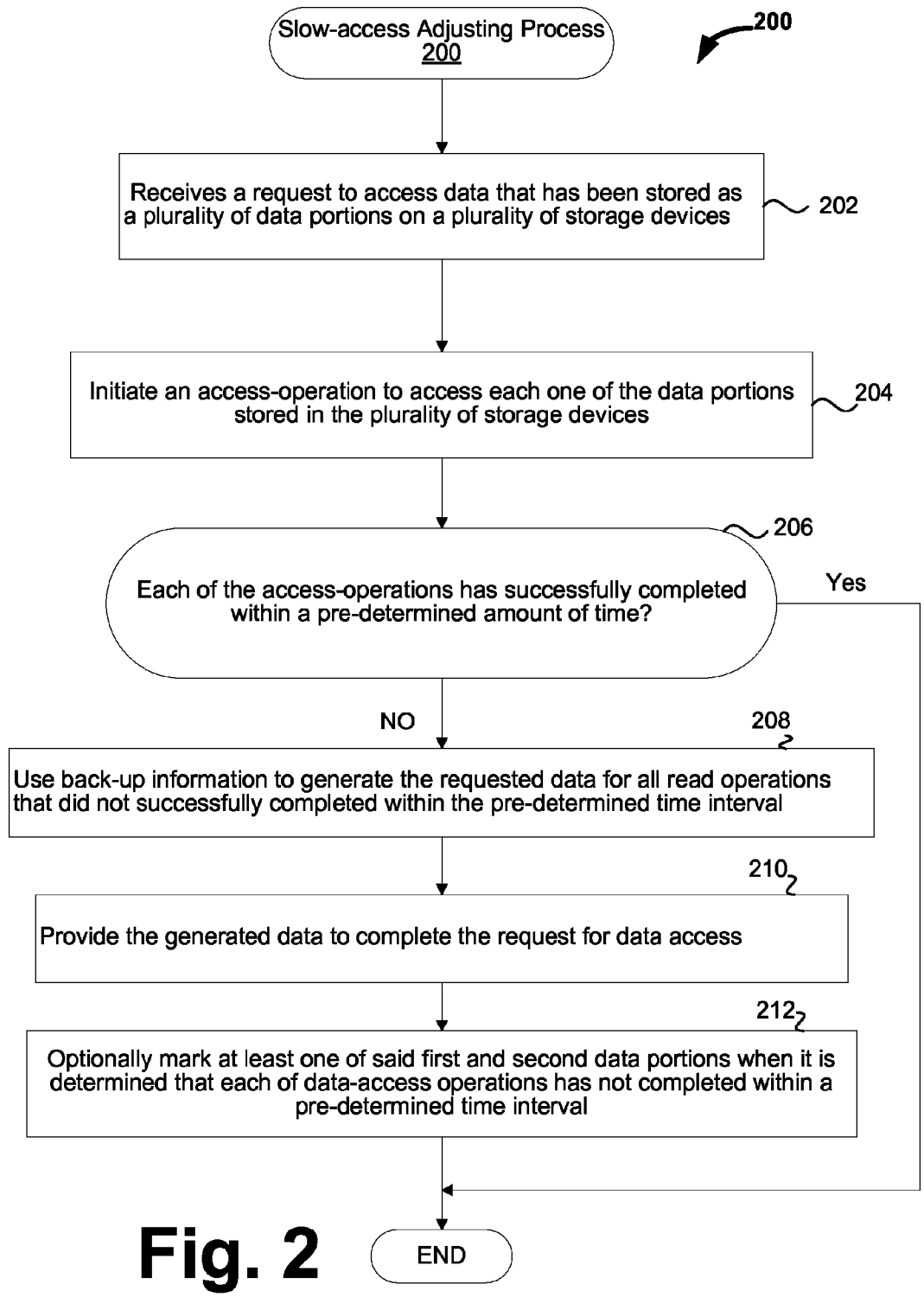
FIG. 2 is a flow diagram of a slow-access adjusting process according to one embodiment of the invention.

FIG. 2 is a flow diagram of a slow-access adjusting process 200 according to one embodiment of the invention. The slow-access adjusting process 200 can, for example, be performed by the slow-access adjustor 110 of FIG. 1A. Initially, the slow-access adjusting process 200 receives 202 a request to access data. Typically, this data has been stored as a plurality of data portions (e.g., data section of a disk) on a plurality of storage devices. In other words, a first portion of the requested data is stored in a first storage device while a second portion of the requested data is stored in a second storage device.

After the request for data has been received, an access-operation is initiated 204 to access each one of the data portions stored in the plurality of storage devices. In other words, a first access-operation is initiated on the first storage device to access the first data portion, and a second access-operation is initiated on the second storage device to access the second data portion. Thereafter, it is determined 206 whether each of the data-access operations has successfully completed within a predetermined amount of time. Again, it should be noted that the predetermined amount of time can, for example, represent an acceptable access-time that is determined for a particular performance requirement. In one embodiment, for example, the predetermined time represents a "rolling average" of expected access times which will be further described below.

In any case, if it is determined 206 that each of the data-access operations has successfully completed within the predetermined amount of time, the slow-access adjusting process 200 ends. However, if it is determined 206 that at least one of the data-access operations has not successfully completed within the predetermined time interval, at least a portion of the requested data is obtained 208 from backup information. In other words, back-up information is used to generate the requested data for all read operations that did not successfully complete within the predetermined amount of time. By way of example, data can be generated (or re-generated) using parity information. Hence, obtaining 208 of data may include generating (or regenerating) data from, for example, parity information. In any case, after data has been obtained using the back-up information, the data request 202 can be completed. Accordingly, the requested data is provided 210 in response to the data access request 202. Optionally, one or more data portions that have not been accessed within the predetermined amount of time can be marked 212 as "slow-access" data portions (or sections). The slow-access adjusting process 200 ends following the optional marking 212.

Figure 3:
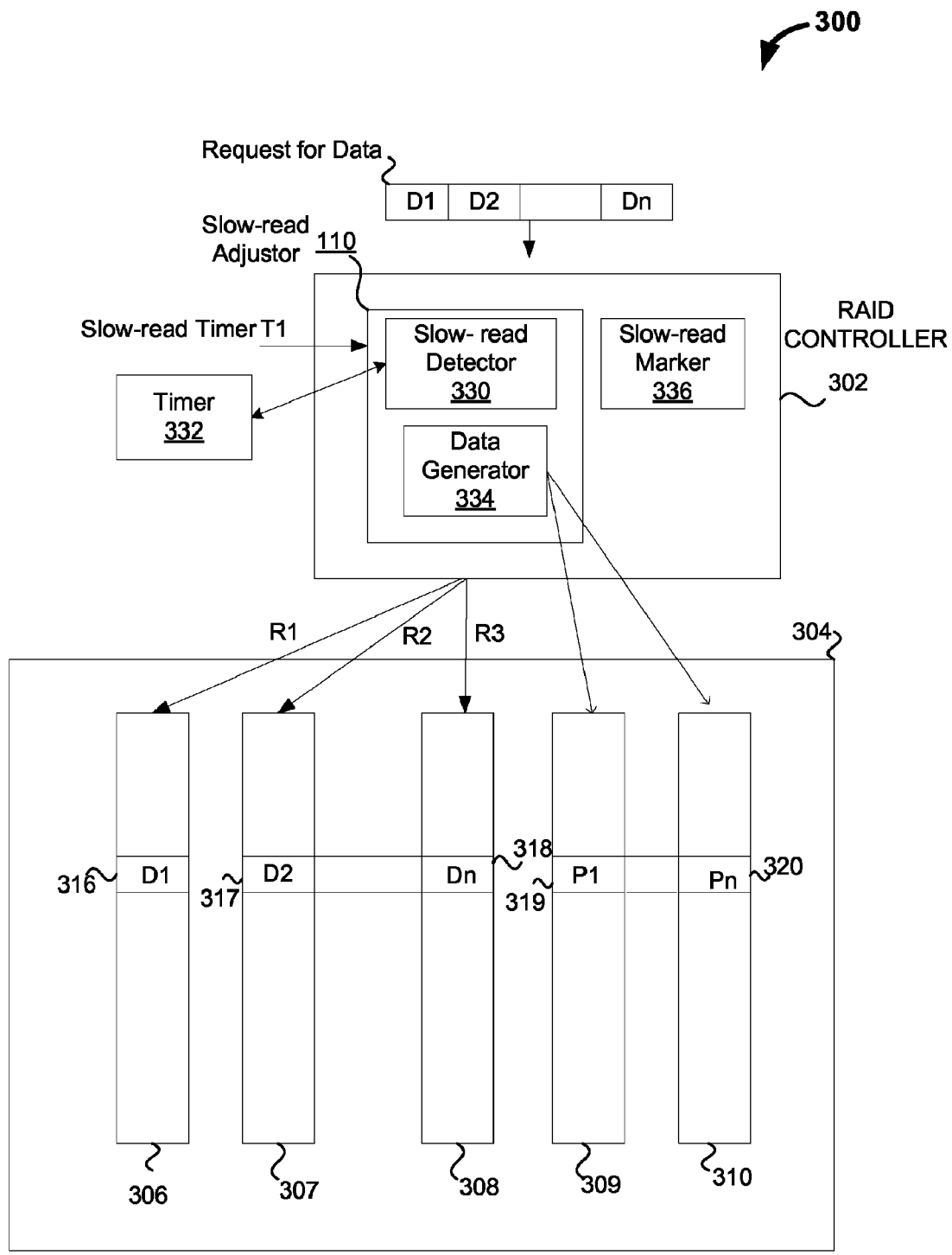
FIG. 3 is a block diagram of a computing system according to another embodiment of the invention.

FIG. 3 is a block diagram of a computing system 300 according to another embodiment of the invention. The computing system 300 depicts a RAID controller 302 provided for a plurality of storage devices arranged as a RAID 304. The RAID controller 302 represents, for example, the storage device controller 107 of FIG. 1 implemented for a RAID 304 in accordance with one embodiment of the invention. Similar to the storage device controller 107, a slow-read adjustor 110 is provided for the RAID controller 302.

For simplicity, the RAID 304 is represented with main storage devices 306, 307 and 308 arranged of storing data $D_1$, $D_2 \ldots D_n$ and auxiliary storage devices 309 and 310 arranged for storing parity ($P_1 \ldots P_n$). However, it should be noted that parity information may be spread between various storage devices of RAID 304. As such, it is not necessary for a storage device to be designated to store the parity information.

In any case, the RAID controller 302 receives a request to access data D (e.g., a record) that has been stored as data portions ($D_1$, $D_2$ and $D_n$) in RAID 304. In other words, data D has been stored as a stripe of data across storage devices 306, 307 and 308 respectively as data portions $D_1$, $D_2$ and $D_n$ in data sections 316, 317 and 318 of storage devices 306, 307 and 308. Parity information $P_1, \ldots, P_n$ has been stored across what can be considered the same stripe across the storage devices 309 and 310 respectively in sections 319 and 320 of storage devices 309 and 310.

In response to the request for accessing data D ($D_1$, $D_2$ and $D_n$), the RAID controller 302 initiates read operations $R_1$, $R_2 \ldots$ and $R_n$ respectively on sections 316, 317 and 318 of the storage devices 306, 307 and 308. A slow-read detector 330 provided as one of the components of a slow-read adjustor 110 operates to obtain a slow-read time t1 to measure the time it takes to complete read operations $R_1, R_2 \ldots$ and $R_n$. The slow-read detector 330 then sets a timer 332 to the slow-read time t1. If the slow-read detector 330 detects that at least one of the read operations $R_1, R_2 \ldots$ and $R_n$ has not successfully completed before the timer 332 expires, a data generator 334 is activated. The data generator 334 then attempts to generate from parity data $(P_1, \ldots, P_n)$ any data portion $(D_1, \ldots, D_n)$ that has not already been obtained by the operations $R_1$, $R_2 \ldots$ and $R_n$. By way of example, if the slow-read detector 330 detects that the read operation $R_2$ has not successful completed when the timer 332 expires, the data generator 334 is activated. Upon activation, data generator 334 attempts to generate data stored in data portion 317 ($D_2$) from parity information $(P_1, \ldots, P_n)$ stored on storage devices 309 and 310. If this attempt is successful, data generator 334 generates data portion D2 using parity information $(P_1, \ldots, P_n)$. Hence, the read operation $R_2$ can be aborted, and data segment $D_1$, $D_2$, and $D_n$ are assembled and returned as data D.

Figure 5:
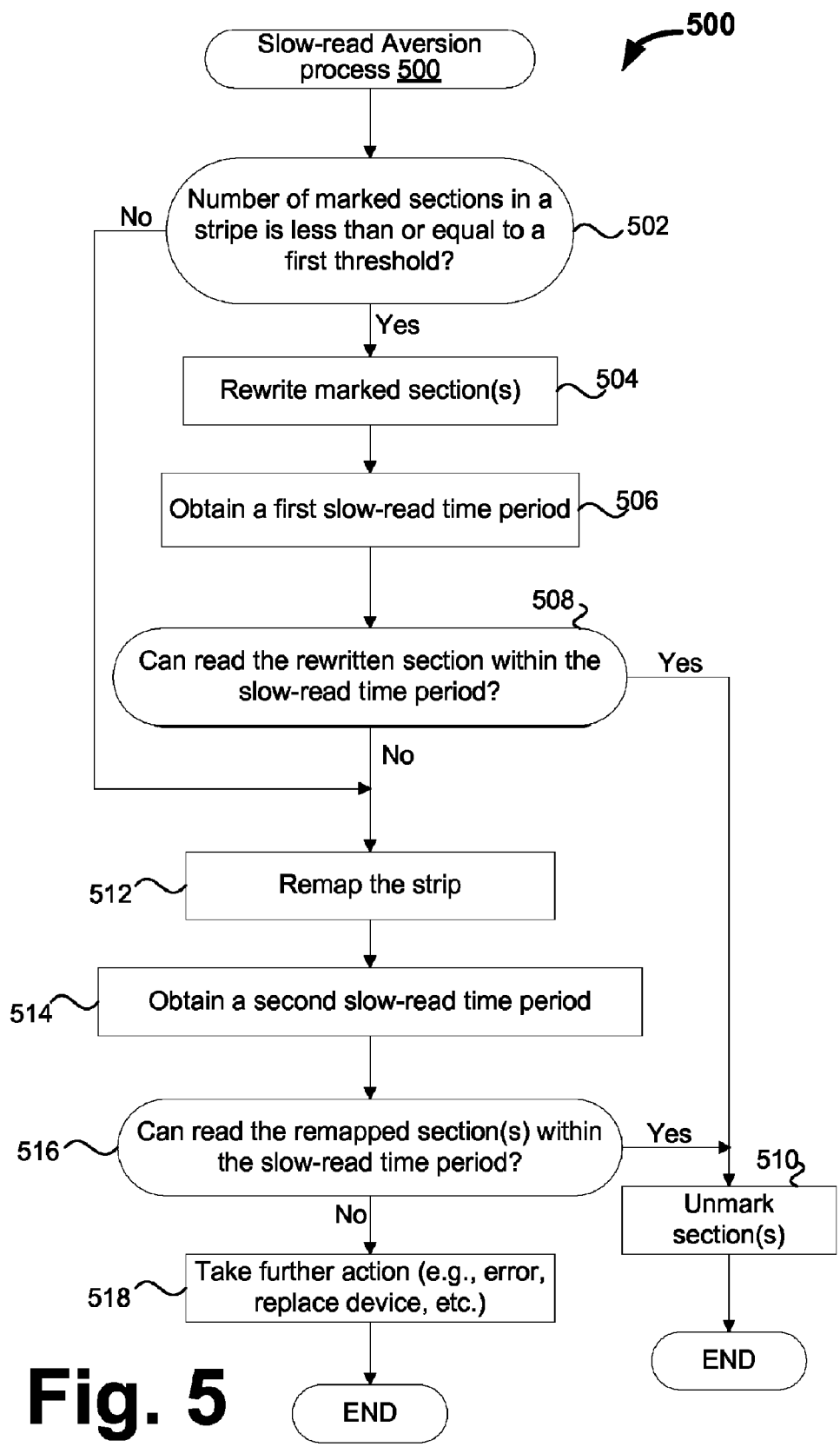
FIG. 5 depicts a slow-read aversion process in accordance with one embodiment of the invention.

It also should be noted that the RAID controller 302 can optionally include a slow-reader marker 336 that marks section 317 (where $D_2$ has been stored) as a "slow-read" section. This enables preventative measures to be taken to prevent slow-read problems from happening again when section 317 is read on a subsequent read operation. As noted above, these preventive actions include, for example, rewriting or remapping data. To further illustrate, FIG. 5 depicts a slow-read aversion process 500 in accordance with one embodiment of the invention.

Figure 4:
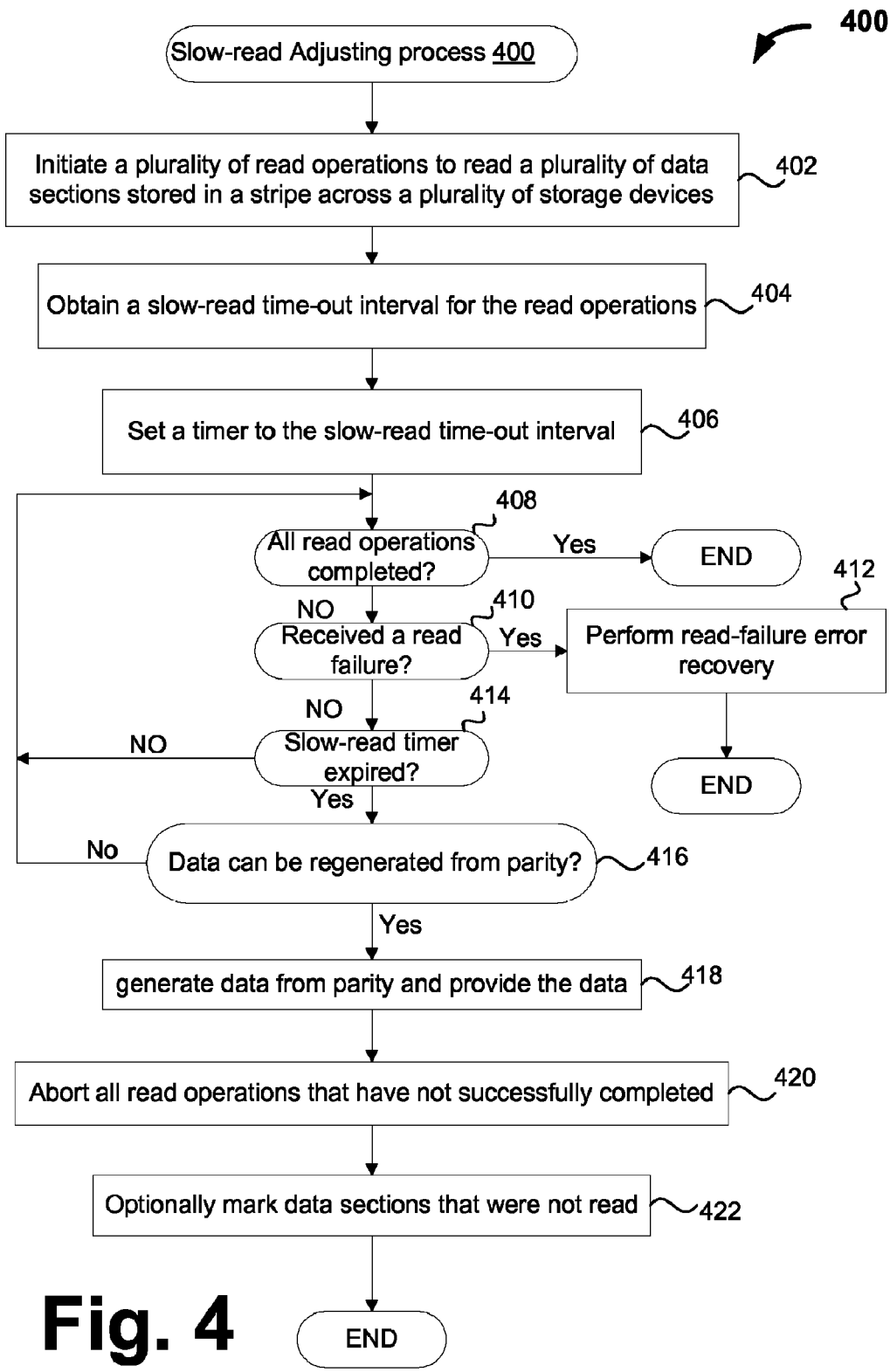
FIG. 4 is a flow diagram for a slow-read adjusting process depicted according to another embodiment of the invention.

However, referring now to FIG. 4, a flow diagram for a slow-read adjusting process 400 is depicted according to another embodiment of the invention. The slow-read adjusting process 400 can, for example, be used by the RAID controller 302 of FIG. 3. The slow-read adjusting process 400 initiates 402 a plurality of read operations to read a plurality of data sections stored as a stripe across a plurality of disks. Next, a slow-read time-out interval is obtained 404 for the read operations and a slow-read timer is set 406 to the slow-read time-out interval. Thereafter, it is determined 408 whether all of the read operations have successfully completed. If is determined 408 that all of the read operations have successfully completed, slow-read adjusting process 400 ends. However, if is determined 408 that at least one of the read operations has not successfully completed, it is determined 410 whether a read failure has been received so that read-failure error recovery can be performed 412. By way of example, an error can be output and conventional read-error recovery can be performed. The slow-read adjusting process 400 ends following the read-failure error recovery operation 412.

On the other hand, if is determined 410 that a read failure has not been received, it is determined 414 whether the slow-read timer has expired. If it is determined 414 that the slow-read timer has not expired, it is determined 408 whether all read operations have successfully completed, and the slow-read adjusting process 400 proceeds in a similar manner as discussed above. However, if it is determined 414 that the slow-read timer has expired, it is determined 416 whether data can be generated from parity. If data cannot be generated from parity, it is determined 408 whether all operations have been completed. In other words, the slow-read adjusting process 400 waits for the read operations to complete 408 or receive 410 a read-failure, and perform 412 read-error recovery.

If it is determined 416 that data can be generated, data is generated 418 from parity and provided. In other words, the slow-read adjusting process 400 does not wait for any read operation to complete or fail if the slow-read timer has expired 414, provided it is also determined 416 that data can be generated from parity. In such cases, data is generated 418 from parity and provided. Accordingly, all read operations that did not successfully complete are aborted 420 because data has been generated using parity. In addition, data sections can optionally be marked 422 as "slow-read" sections so that preventative measures can be taken to prevent slow-read problems from happening in the future. FIG. 5 illustrates preventative measures that can be taken in accordance with one embodiment of the invention. Slow-read adjusting process 400 ends following optional marking 422.

FIG. 5 depicts a slow-read aversion process 500 in accordance with one embodiment of the invention. The slow-read aversion process 500 is typically done during maintenance time, however, this is not a requirement. The slow-read aversion process 500 initially determines 502 whether the number of marked sections in a stripe is less than or equal to a threshold (e.g., two sections in a stripe). If it is determined 502 that the number of marked sections in a stripe is less than or equal to the threshold, the marked section(s) are rewritten 504. Thereafter, a slow-read time period is obtained 506, and it is determined 508 whether the data in the section can be read within the slow-read time period. In other words, slow-read aversion process 500 determines whether the rewriting 504 of the data has solved the "slow-read" problem for the marked sections. To achieve this, it is determined 508 whether data can be read within an acceptable time period (i.e., a "slow-read" time period). If it is determined 508 that the "slow-read" problem is resolved (i.e., rewritten data can be read within the slow-read time period), the marked section(s) is unmarked 510 and the slow-read aversion process 500 ends.

However, if the slow-read aversion process 500 determines 508 that the rewritten data cannot be read within the slow-read time period or it is determined 502 that whether the number of marked sections in the stripe is greater than the threshold, the strip is remapped 512 to a different cross section of disks. Next, a second slow-read time period is obtained 514. As will be appreciated by those skilled in the art, this second slow-read period may be the same as the first slow-read time period obtained 506. However, the second slow-read time interval may be different to compensate for different read time expectations, for example, as a result of remapping data. As will be appreciated by those skilled in the art, read time expectations may vary for different sections of a disk. Generally, it should take less time to read sections that are closer to the perimeter of the disk than those situated closer to the center.

In any case, after remapping 512, it is determined 516 whether the remapped section(s) can be read within the slow-read time period obtained at operation 514. The slow-read aversion process 500 ends following unmarking 510 of the section(s) if it is determined 516 that the remapped section(s) can be read within the slow-read time period obtained 514. However, if this is not the case, further action can be taken 518 to resolve the slow-read problem. For example, an error can be output, and the disk may be reformatted or replaced to improve the read time. In any case, the slow-read aversion process 500 ends following operation 518.

As noted above, a "rolling average" of expected access times can be used to determine a "slow-read" time out interval. This time interval can be used, for example, as the time period obtained 404 to set a timer 406 as shown in FIG. 4. This "rolling average" can, for example, be determined in a similar manner as an average transfer time determined for data transfer performance monitoring methods illustrated in U.S. Pat. No. 7,134,053, which is hereby incorporated herein by reference for all purposes.

By way of example, in one embodiment, an average transfer time for the disk drive is obtained. After transferring a first number of data blocks from the disk drive, the transfer time for the time it takes to transfer the first number of data blocks from the disk drive is measured. Thereafter, it is determined whether the measured transfer time is substantially greater than the average transfer time, and a performance error count is increased accordingly when the measured transfer time is substantially greater than the average transfer time. In this way, the average transfer time may be adjusted for more meaningful performance analysis.

As will be appreciated by those skilled in the art, in a similar manner, an average expected read time for a disk drive can be obtained. After reading a first number of data blocks from the disk drive, the time it takes to read the first number of data blocks from the disk drive is measured. Thereafter, it is determined whether the measured read time is substantially greater than the average read time, and a slow-read error count is increased accordingly when the measured slow-read time is substantially greater than the average expected read time. In this way, the average expected read time may be adjusted and more meaningful slow-read time periods may be obtained for various sections of a disk. More details about the average transfer times are described in U.S. Pat. No. 7,134,053.

The advantages of the invention are numerous. Different embodiments or implementations may yield one or more of the following advantages. It should be noted that this is not an exhaustive list and there may be other advantages which are not described herein. One advantage of the invention is that improved performance (e.g., data throughput) of disk drives or RAIDs can be achieved by reducing delay time of slow access operations. Another advantage of the invention is that overall performance can be enhanced by taking preventative measures that reduce the reoccurrence of slow access problems. Yet another advantage of the invention is that preventative measures can be performed cost effectively during maintenance times. Still another advantage is that the invention can be cost effectively implemented to use parity information which is typically provided for RAIDs.

The various aspects or features of the invention described above can be used alone or in various combinations. The invention is preferably implemented by software, but can also be implemented by hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of accessing first data stored in a first location in a first storage device, the method comprising:
   initiating a disk access operation for the first data on the first storage device;
   if the disk access operation is slow:
      reconstructing the first data from second data stored on a backup storage device without generating an error;
      remapping the first data from the first location to a third location on the first storage device; and
      remapping the second data from the second location to a fourth location on the second storage device, wherein the second location and the fourth location are in a stripe across same sections with respect to a beginning point of the corresponding storage device.

2. The method of claim 1, further comprising:
   prior to remapping the first data from the first storage device, rewriting the first data in the first location existing location on the first storage device using the reconstructed first data from the second storage device.

3. The method of claim 1, wherein the reconstructing includes using parity information to reconstruct the first data.

4. A method of accessing first data stored in a first storage device, the method comprising:
   initiating a first disk access operation for the first data on the first storage device;
   if the first disk access operation is slow:
      reconstructing the first data from second data stored on a backup storage device without generating an error;
      rewriting the first data in first location using the reconstructed first data;
      testing the first location by initiating a second disk access operation for the first data on the first storage device;
      if the second disk access operation is slow:
         remapping the first data from the first location to a third location on the first storage device; and
         remapping the second data from the second location to a fourth location on the second storage device, wherein the second location and the fourth location are in a stripe across same sections with respect to a beginning point of the corresponding storage device.

5. The method of claim 4, wherein the reconstructing includes returning the reconstructed first data to a requesting program in a way that the requesting program is unaware that the first data was reconstructed.

6. The method of claim 5, wherein the returning includes sending the reconstructed first data to the requesting program without passing along an error indication.

7. The method of claim 6, wherein the method is performed by a controller of the first storage device.

8. A storage device controller coupled to a first and a second storage device and to a computing system, the storage device controller comprising:
   a slow access adjustor configured to:
      initiate a disk access operation for the first data on the first storage device;
      if the disk access operation is slow:
         reconstruct the first data from second data stored on a backup storage device without generating an error;
         remap the first data from the first location to a third location on the first storage device; and
         remap the second data from the second location to a fourth location on the second storage device, wherein the second location and the fourth location are in a stripe across same sections with respect to a beginning point of the corresponding storage device.

9. The storage device controller of claim 8, wherein the remapping the first data includes erasing existing data from the first location and the remapping the second data includes erasing existing data from the third location.

10. The storage device controller of claim 8, wherein the storage device controller is a RAID controller.

11. The storage device controller of claim 8, wherein the storage device controller is further coupled to a parity disk.

12. An apparatus comprising:
   means for initiating a disk access operation for the first data on the first storage device;
   means for, if the disk access operation is slow:
     reconstructing the first data from second data stored on a backup storage device without generating an error;
     remapping the first data from the first location to a third location on the first storage device; and
     remapping the second data from the second location to a fourth location on the second storage device, wherein the second location and the fourth location are in a stripe across same sections with respect to a beginning point of the corresponding storage device.

13. The apparatus of claim 12, wherein the means for initiating is a slow access adjustor in a disk storage controller.

14. The apparatus of claim 12, wherein a disk access operation is slow if it takes more than a predetermined period of time to complete.

15. The apparatus of claim 14, wherein the predetermined period of time for the second disk access operation is different from the predetermined period of time for the first disk access and is adjusted based upon the proximity of the location of the remapped first and second data to the center of their respective storage devices.

16. The apparatus of claim 14, wherein the predetermined period of time is based on a rolling average of expected access times.

17. A program storage device readable by a machine, tangibly embodying a program of instructions executable by the machine to perform a method of accessing first data stored in a first storage device, the method comprising:
   initiating a disk access operation for the first data on the first storage device;
   if the disk access operation is slow:
     reconstructing the first data from second data stored on a backup storage device without generating an error;
     remapping the first data from the first location to a third location on the first storage device; and
     remapping the second data from the second location to a fourth location on the second storage device, wherein the second location and the fourth location are in a stripe across same sections with respect to a beginning point of the corresponding storage device.

18. The program storage device of claim 17, wherein the reconstructing uses parity information on a parity disk to reconstruct the first data.

* * * * *

UNITED STATES PATENT AND TRADEMARK OFFICE
CERTIFICATE OF CORRECTION

| | | |
|---|---|---|
| PATENT NO. | : 7,822,922 B2 | Page 1 of 1 |
| APPLICATION NO. | : 11/682113 | |
| DATED | : October 26, 2010 | |
| INVENTOR(S) | : Michael Eng et al. | |

It is certified that error appears in the above-identified patent and that said Letters Patent is hereby corrected as shown below:

On Title page 2, in column 2, under "Other Publications", line 43, delete "Annaul" and insert -- Annual --, therefor.

On Title page 3, in column 1, under "Other Publications", line 19, delete "Proceeding" and insert -- Proceedings --, therefor.

In column 1, line 3, below "WITHOUT WAITING FOR READ ERRORS" insert -- CROSS-REFERENCE TO RELATED APPLICATIONS --.

Signed and Sealed this
Fifteenth Day of November, 2011

David J. Kappos
*Director of the United States Patent and Trademark Office*